United States Patent [19]

Sugiyama

[11] 4,381,749
[45] May 3, 1983

[54] INTAKE DEVICE FOR ENGINE

[75] Inventor: Keiichi Sugiyama, Shizuoka, Japan

[73] Assignee: Yamaha Hatsudoki Kabushiki Kaisha, Iwata, Japan

[21] Appl. No.: 260,036

[22] Filed: May 4, 1981

[30] Foreign Application Priority Data

Feb. 21, 1980 [JP] Japan .................................. 55-21142

[51] Int. Cl.³ ............................................ F02B 29/02
[52] U.S. Cl. .................................... 123/432; 123/308
[58] Field of Search .................... 123/308, 432, 52 M, 123/442

[56] References Cited

U.S. PATENT DOCUMENTS 4,292,944 10/1981 Matsumoto et al. ........... 123/308 X

Primary Examiner—William A. Cuchlinski, Jr.
Attorney, Agent, or Firm—Ernest A. Beutler

[57] ABSTRACT

An induction system for an internal combustion engine including an auxiliary induction system formed by a spacer and a plurality of pipes extending from the spacer into each of the engine cylinder head main intake passages. Each pipe is formed with a deflector portion at its end so that a charge will be delivered directly to the chambers of the engine from the pipes without impingement upon the cylinder head surfaces.

10 Claims, 5 Drawing Figures

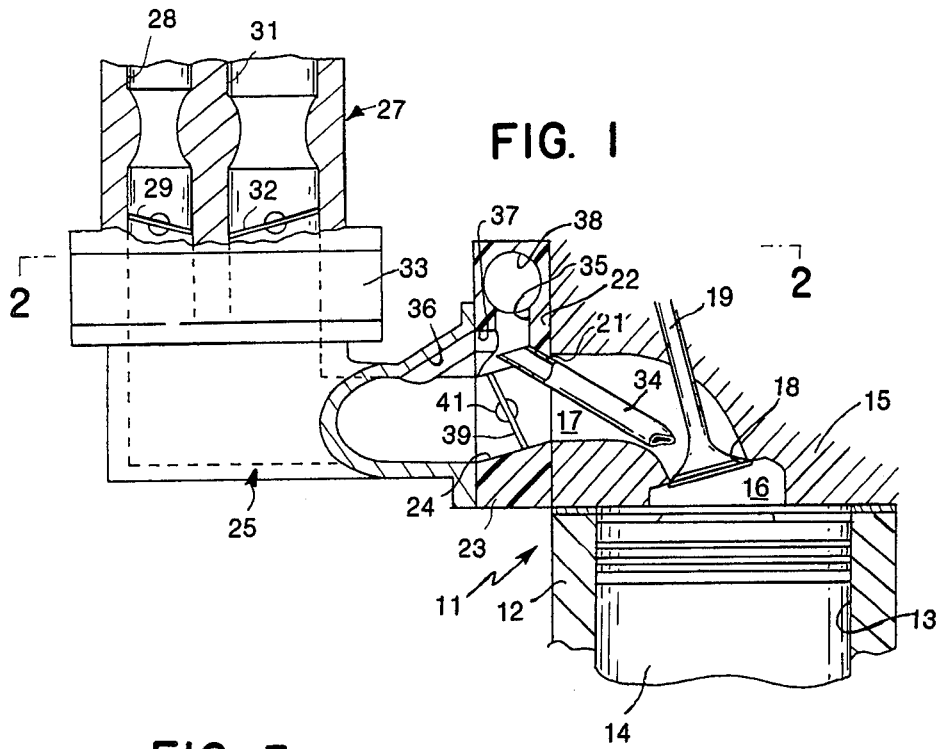
FIG. 1
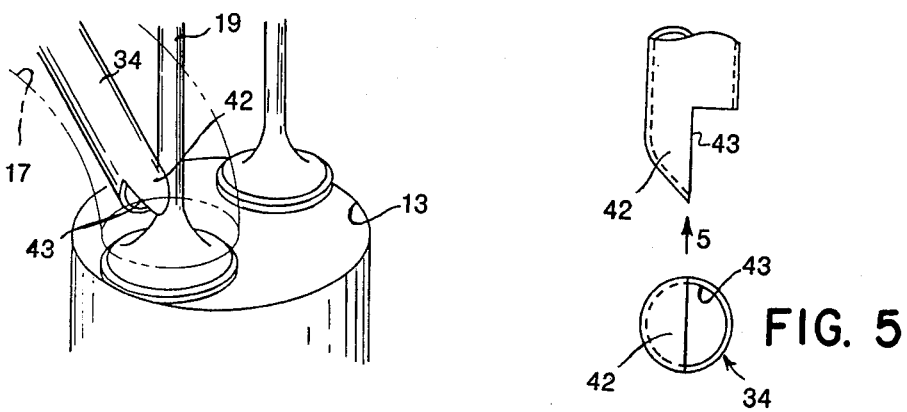
FIG. 3
FIG. 4
FIG. 5

INTAKE DEVICE FOR ENGINE

BACKGROUND OF THE INVENTION

This invention relates to an induction system for an internal combustion engine and more particularly to an improved induction system that improves low speed running and efficiency.

It has been recently acknowledged that the idle in low speed performance of an internal combustion engine can be significantly improved by providing the intake charge to these chambers through a relatively small auxiliary induction passage. The use of such a small passage increases the velocity at which the charge enters the chamber and promotes turbulence in the chamber which may be maintained during the compression and ignition cycles. This increased turbulence improves flame propagation and significantly improves both fuel economy and the control of unwanted exhaust gas emissions at these low running conditions.

The aforenoted advantages may be gained and the construction of the engine simplified if the auxiliary induction system discharges into the main induction system close to its point of discharge into the chambers. Where, however, the combustion chamber is of the pent roof or bathtub type and is formed primarily in the cylinder head around the intake valves, certain disadvantages may result from such an arrangement. If a relatively small volume defining the combustion chamber surrounds the intake valve, the discharge from the auxiliary induction system may impinge upon the cylinder head walls which define the combustion chamber and the high velocity of the charge entering from the auxiliary intake passage will be dissipated. Furthermore, with such an arrangement it is difficult to control the actual flow in the chamber when the piston is commencing its compression stroke. That is, the wall of the cylinder head may deflect the flow of the charge from the auxiliary intake passage and prevent the desired flow pattern from being established in the cylinder during the compression and firing cycles.

It is, therefore, a principle object of this invention to provide an induction system for an internal combustion engine using an auxiliary intake system for supplying low speed charge requirements wherein the direction of flow from the auxiliary intake system may be accurately controlled.

It is another object of this invention to provide an auxiliary intake system for an internal combustion engine that discharges into the main intake system and which embodies an arrangement for controlling the direction of discharge from the auxiliary system into the chamber.

As has been noted, it is desirable to provide the discharge from the auxiliary intake system into the main intake system close to its point of discharge into the chamber. In connection with certain existing types of engines it may be difficult to achieve this without significantly modifying the cylinder head and its intake passages. That is, some existing type of engines do not readily lend themself to modification to incorporate an auxiliary induction system of the type previously described.

It is, therefore, a further object of this invention to provide a system whereby a conventional existing engine may be conveniently modified to incorporate an auxiliary induction system which will discharge into the main induction system of the engine.

SUMMARY OF THE INVENTION

A first feature of this invention is adapted to be embodied in an induction system for a variable volume chamber of an internal combustion engine comprising a main intake passage discharging into the chamber and an auxiliary induction passage having an outlet communicating with the main intake passage contiguous to its point of discharge into the chamber. The auxiliary induction passage has a substantially smaller affective area than the main intake passage. In conjunction with this feature of the invention, deflector means are positioned in the outlet of the auxiliary induction passage for redirecting the flow issuing therefrom.

A further feature of this invention is adapted to be embodied in an induction system for a variable volume chamber of an internal combustion engine that comprises a cylinder head formed with a main intake passage communicating with the chamber at its outlet end and opening at its other end through a wall of the cylinder head. A spacer is affixed to the wall of the cylinder head and has a main intake passage that is aligned with the opening of the cylinder head inlet passage. A pipe is affixed to the spacer and extends into the cylinder head intake passage. The pipe terminates at one end contiguous to the outlet end of the main intake passage. Means communicate the other end of the pipe with a volume.

BRIEF DESCRIPTION OF THE DRAWINGS

FIG. 1 is a cross sectional view taken through a portion of an internal combustion engine with further portions broken away;

FIG. 3 is a perspective view showing the cylinder bore and the arrangement of the valves and intake system relative to it;

FIG. 4 is an enlarged side elevational view of the discharge end of the auxiliary intake system; and FIG. 5 is a plan view taken in the direction of the arrow 5 in FIG. 4.

DETAILED DESCRIPTION OF THE PREFERRED EMBODIMENT OF THE INVENTION

Figure 2:
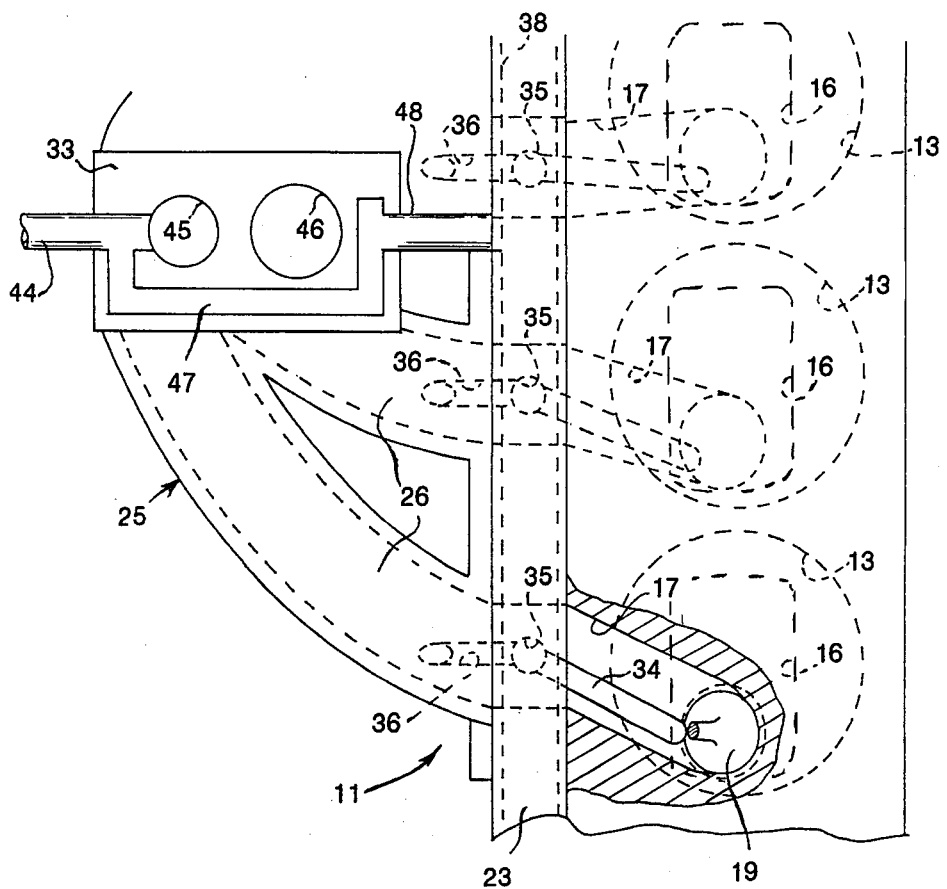
FIG. 2 is a top plan view of a portion of the engine shown in FIG. 1.

An internal combustion engine constructed in accordance with this invention is identified generally by the reference numeral 11. Engine 11 is of the in line four cylinder type (although not all cylinders are shown). It is to be understood, however, that the invention may be employed with engines having other configurations and engines other than the reciprocating type. The invention is particularly adapted to be used in conjunction with converting existing type engines to incorporate the use of an auxiliary induction system for improving low speed running.

The engine 11 includes a cylinder block 12 having a plurality of cylinder bores 13. Pistons 14 are reciprocably supported in the cylinder bores 13 and drive a crankshaft (not shown) in a known manner.

A cylinder head 15 is affixed to the cylinder block 12 and has a plurality of chambers 16 which comprise the combustion chambers when the pistons 14 are at their top dead center. Chambers 16 are of the inverted bathtub type in the illustrated embodiment. It is to be understood, however, that this invention is particularly adapted for use in any type of engine wherein the combustion chamber is formed primarily in a recess in the cylinder head in which the valves are positioned. Other such types of combustion chambers are the wedge type, pent roof type, or the like.

Main intake passages 17 are formed in the cylinder head 15 and have main intake ports 18 that are in communication with the respective chambers 16. Main intake valves 19 cooperate with the ports 18 to control the flow from the main intake passages 17 into the combustion chamber 16 and the resulting variable volume chamber that is formed during the reciprocation of the pistons 14. The cylinder head main intake passages 17 all terminate in openings 21 formed in a side surface 22 of the cylinder head 15. A spacer element 23 is affixed to the side of the cylinder head 22 in any known manner and has main intake passages 24 that register with the cylinder head intake passage openings 21. An intake manifold, indicated generally by the reference numeral 25 is also affixed to the cylinder head 15 with the spacer 23 being sandwiched between the intake manifold 25 and the cylinder head surface 22. The intake manifold has a plenum area from which individual runners 26 extend to and terminate at the spacer main intake passages 24. A carburetor, indicated generally by the reference numeral 27 is provided for supplying a fuel air charge to the intake manifold 25 and chambers 16. In the illustrated embodiment, the carburetor 27 is of the two-stage type and includes a primary side 28 having a primary throttle valve 29 and a secondary side 31 having a secondary throttle valve 32. As is well known with this type of carburetor, the primary side 28 serves low and medium speed conditions and the secondary side 31 opens either automatically or via a linkage system so as to begin to supply charge requirements as the load and speed on the engine 11 increase. An insulating spacer 33 is interposed between the carburetor 29 and the intake manifold 25.

Except for the use of the spacer 23 and the components associated with it, which have not as yet been described, the construction of the engine 11 is generally conventional. In accordance with this invention, however, the spacer 23 is used as a device whereby the engine 11 may be provided with an auxiliary induction system for delivering a charge to the chamber 16 at a high velocity at idle and low speeds. This high velocity charge improves the flame propagation within the combustion chamber 16 and significantly prooves low speed performance both in the terms of fuel economy and control of exhaust gas emissions.

A plurality of auxiliary intake pipes 34 are press fit or otherwise affixed to the spacer 23 and are adapted to extend into the cylinder head main intake passages 17 when the spacer 23 is affixed to the cylinder head surface 22. The pipes 34 terminate adjacent the heads of the intake valves 19 for discharge into the chambers 16 in a manner which will be described.

The inlet end of each pipe 34 communicates with a vertically extending passage 35 formed in the spacer 23. The manifold 25 is provided with a plurality of auxiliary induction system inlets 36 that extend from the runners 26 and intersect a horizontally extending passage 37 in the spacer 23 which passage in turn intersects the vertically extending passages 35. Thus, an individual auxiliary intake passage is provided for each chamber 16 via the manifold passage 36, spacer passages 37 and 35, and pipes 34. These individual passages are communicated with each other by means of a longitudinally extending balance passage 38 that extends through the spacer 23 and is intersected by each of the passages 35. In this way, the auxiliary intake pipes 34 each communicate with the others and communication is established between each of the main cylinder head intake passages 17 through the auxiliary intake system.

In order to control the proportion of charge delivered to the chamber 16 between the main auxiliary intake systems, a plurality of throttle valves 39 are provided in the spacer 23 in its passages 24. The throttle valves 39 are all affixed to a common throttle valve shaft 41 which is operated either automatically or via a linkage that is interconnected with the carburetor throttle valve 29. The linkage or connection is such that during initial opening of the carburetor throttle valve 29 the control valves 39 are maintained in a closed position. As a result, the charge delivered from the carburetor 27 will be passed into the chamber 16 through the auxiliary induction system. Due to the substantially lesser effective cross sectional area of the auxiliary induction system this charge will enter the chamber 16 at a significantly higher velocity than if it were delivered through the main intake system. As a result, a high degree of swirl and turbulence is introduced in the chamber 16 which is maintained during the intake and compression strokes so as to improve flame propagation and engine running, as aforenoted.

The combustion chamber 16 is offset from the center of the cylinder bore 13 and is recessed a considerable distance into the lower surface of the cylinder heads 15. As a result, discharge from an open end of the pipe 34 would tend to strike the walls of the recess 16 to effect redirection of the flow from the auxiliary intake system and dissipation of its high velocity. In order to prevent such dissipation and redirection of the flow, an arrangement is provided at the ends of the auxiliary intake pipes 34 for directing the flow issuing from the auxiliary induction system directly to the cylinder bore 13 in a swirling fashion without striking the walls of the cylinder head 15 that define the chamber 16. This redirection device is best shown in FIGS. 3-5.

The end of each pipe 34 is provided with a deflector portion 42 that has a generally spoon shape and which provides an outlet opening 43 that is offset at a right angle to the main axis of the auxiliary pipe 34. Of course, the exact angle of redirection provided by the opening 43 will depend upon the specific engine configuration and orientation of the pipe 34 relative to the main intake passage 17. However, the deflector portion 42 and opening 43 should be arranged so that the flow that issues from the auxiliary intake system will enter the cylinder bores 13 without substantial impingement on the walls of the cylinder head 15 that define the chambers 16 and so as to establish the swirling motion within the cylinder bores 13 which will be maintained during the intake and compression strokes until ignition occurs.

It has been previously noted that the control valves 39 are opened sequentially with the throttle 29. That is, valves 39 do not begin to open until the carburetor throttle 29 is opened to a predetermined angle. When the opening of the control valves 39 has commenced, an increasing proportion of the charge for the chambers 16 will be supplied through the main intake system including the main cylinder head intake passages 17. The control valve operating mechanism is such that continued opening of the throttle valve 29 will result in accelerated opening of the control valves 39 so that the throttle valve 29 and control valves 39 will be fully opened at approximately the same time.

The engine 11 is also provided with an exhaust gas recirculating system that includes a pipe 44 (FIG. 2) that delivers a portion of the exhaust gases under certain running conditions to the induction system. Pipe 44 communicates with the spacer 33 and specifically with a primary induction passage 45 of the spacer 33 that is aligned with the primary side 28 of the carburetor 27. Spacer 33 also has a secondary passage 46 that is aligned with the carburetor secondary side 31. A portion of the recirculated exhaust gases is also delivered to the chamber 16 directly through the auxiliary induction system. For this purpose, the spacer 33 is provided with a passage 47 which communicates with a pipe 48 that, in turn, communicates with the auxiliary induction system balance passage 38. As a result, a portion of the exhaust gases under certain running conditions may be delivered directly to the chambers 16 at a high velocity through the auxiliary induction system, specifically the auxiliary intake pipes 34. This high velocity induction of the exhaust gases into the chamber 16 has been found to permit a wider latitude of EGR tolerance.

It should be readily apparent from the aforegoing description that this invention permits the convenient adaptation of conventional engines to the use of an auxiliary induction system for improving low speed engine running and efficiency. Also, the provision of the deflectors 42 on the pipes 34 permits the charge to be directed into the chambers without significant loss of velocity due to impingement upon the cylinder head surfaces. Furthermore, the deflectors 42 may be arranged so as to prevent any substantial impingement of the auxiliary intake flow on the heads of the intake valves 19 even though the auxiliary discharge takes close to these valves. Various changes and modifications may be made without departing from the spirit and scope of the invention, as defined by the appended claims.

What is claimed is:

1. In an induction system for a variable volume chamber of an internal combustion engine comprising a main intake passage discharging into said chamber and an auxiliary induction passage formed at least in part by a pipe extending into the main intake passage and terminating contiguous to its point of discharge into the chamber and having an outlet communicating with said main intake passage contiguous to its point of discharge into said chamber, said auxiliary induction passage having a substantially smaller effective area than said main intake passage, the improvement comprising deflector means positioned at the outlet of said auxiliary induction passage for redirecting the flow issuing therefrom, said deflector means comprising an integral end portion of said pipe configured to direct the flow from the pipe in a direction other than along the axis of the pipe.

2. An induction system as set forth in claim 1 wherein the variable volume chamber is formed at least in part by a recess in a cylinder head, the main intake passage being formed in the cylinder head and terminating at a main intake port in said recess, and an intake valve for controlling the communication of said main intake passage with said recess.

3. An induction system as set forth in claim 2 wherein the auxiliary intake passage outlet is disposed in proximity to the intake valve when the intake valve is in its closed position.

4. An induction system as set forth in claims 1 or 3 further including valve means for controlling the proportion of charge delivered to the chambers through the main and auxiliary intake passages.

5. An induction system as set forth in claim 4 wherein the auxiliary induction passage has its inlet disposed in the main induction passage upstream of the valve and the valve is located upstream of the discharge of the main intake passage and of the auxiliary induction passage.

6. An induction system as set forth in claim 5 wherein the valve is supported in a spacer affixed to the engine, the pipe being press fit into said spacer.

7. An induction system as set forth in claim 5 wherein there are a plurality of cylinders each having main intake passages and auxiliary induction passages as defined.

8. An induction system for a variable volume chamber of an internal combustion engine comprising a cylinder head formed with a main intake passage communicating with said chamber at is outlet end and opening at its other end through a wall of said cylinder head, a spacer affixed to said wall of said cylinder head and having a main intake passage aligned with the opening of said cylinder head main intake passage, a pipe supported by said spacer and extending into said cylinder head main intake passage, said pipe terminating at one end contiguous to the outlet end of said main intake passage, and means for communicating the other end of the pipe with a charge source for providing a charge to the chamber through said pipe.

9. An induction system for a variable volume chamber of an internal combustion engine comprising a cylinder head formed with a main intake passage communicating with said chamber at is outlet end and opening at its other end through a wall of said cylinder head, a spacer affixed to said wall of said cylinder head and having a main intake passage aligned with the opening of said cylinder head main intake passage, a pipe supported by said spacer and extending into said cylinder head main intake passage, said pipe terminating at one end contiguous to the outlet end of said main intake passage, and a valve in said main intake passage of said spacer, said pipe having its inlet in communication with the spacer main intake passage upstream of the valve.

10. An induction system as set forth in claim 9 wherein there are a plurality of chambers, there being one main cylinder head intake passage serving each of the chambers, the spacer being comprised of a common member affixed to the cylinder head and having main intake passages aligned with each of the cylinder head intake passages, there being a pipe supported by the spacer and extending into each of the cylinder main intake passages.

* * * * *